United States Patent
Prytz et al.

(10) Patent No.: US 8,200,820 B2
(45) Date of Patent: Jun. 12, 2012

(54) ACCESS SELECTION METHOD

(75) Inventors: Mikael Prytz, Rönninge (SE); Per Magnusson, Linköping (SE); Johan Lundsjö, Spånga (SE); Joachim Sachs, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 515 days.

(21) Appl. No.: 12/063,597

(22) PCT Filed: Aug. 12, 2005

(86) PCT No.: PCT/EP2005/008812
§ 371 (c)(1),
(2), (4) Date: Feb. 12, 2008

(87) PCT Pub. No.: WO2007/019871
PCT Pub. Date: Feb. 22, 2007

(65) Prior Publication Data
US 2008/0235376 A1    Sep. 25, 2008

(51) Int. Cl.
*G06F 15/173* (2006.01)
(52) U.S. Cl. .................. 709/225; 455/525; 370/254
(58) Field of Classification Search .......... 709/224–225; 455/525; 370/254
See application file for complete search history.

(56) References Cited

U.S. PATENT DOCUMENTS

| | | | | |
|---|---|---|---|---|
| 7,173,918 B2 * | 2/2007 | Awater et al. | | 370/332 |
| 7,509,129 B2 * | 3/2009 | Sinivaara | | 455/453 |
| 2002/0069284 A1 * | 6/2002 | Slemmer et al. | | 709/227 |
| 2002/0110105 A1 * | 8/2002 | Awater et al. | | 370/338 |
| 2003/0139197 A1 * | 7/2003 | Kostic et al. | | 455/525 |
| 2004/0136324 A1 * | 7/2004 | Steinberg et al. | | 370/238 |
| 2004/0233868 A1 | 11/2004 | Farnham | | |
| 2004/0264427 A1 * | 12/2004 | Jaakkola et al. | | 370/338 |
| 2005/0165953 A1 * | 7/2005 | Oba et al. | | 709/238 |
| 2005/0185615 A1 * | 8/2005 | Zegelin | | 370/331 |
| 2005/0208950 A1 * | 9/2005 | Hasse | | 455/453 |
| 2006/0025127 A1 * | 2/2006 | Cromer et al. | | 455/432.1 |
| 2006/0239207 A1 * | 10/2006 | Naghian | | 370/254 |
| 2007/0110080 A1 * | 5/2007 | Bennett | | 370/400 |

FOREIGN PATENT DOCUMENTS

| | | |
|---|---|---|
| EP | 1 104 975 | 6/2001 |
| EP | 1 526 682 | 4/2005 |
| WO | 02/01807 | 1/2002 |
| WO | 2005/060294 | 6/2005 |

* cited by examiner

*Primary Examiner* — Duyen Doan
(74) *Attorney, Agent, or Firm* — Coats & Bennett, P.L.L.C.

(57) ABSTRACT

A method of access management in a communication system comprising a terminal, a first access point, a second access point and a network is described. The first access point offers a first access connection to the terminal and the second access point offers a second access connection to the terminal. A first network connection is provided between the network and the first access point and a second network connection is provided between the network and the second access point. Access connection information associated with at least one of the first and second access connections is monitored, and network connection information associated with at least one of the first and second network connections is monitored. An access connection selection decision is based on the monitored access connection information and the monitored network connection information.

9 Claims, 6 Drawing Sheets

ACCESS SELECTION METHOD

FIELD OF THE INVENTION

The present invention relates to a method of access management in a multi-access communication system, to such a system, and to entities in such a system and corresponding control methods.

BACKGROUND OF THE INVENTION

In modern communication systems there can occur a situation in which a terminal is capable of accessing a network via more than one access point. For example, a terminal can be connected to a first access point having a first access technology and to a second access point having a second access technology, where both access points in turn provide a connection to a common network, such as e.g. the Internet. In this case the terminal is in a multi-access or multi-resource (each access can be seen as a resource) environment. Such a situation is especially known within the context of having plural radio access possibilities, and in this context it is known to provide so-called multi-radio resource management (MRRM). MRRM includes access advertisement, access discovery, access selection and load management in a cooperative or competitive environment. Cooperation can e.g. take place at the radio resource level between any combination of traditional mobile network operators on the one hand and new operators with different roles in the service delivery value network, e.g. access brokers, local access providers or end users acting as relays for other users. The logic behind cooperation can be the desire to efficiently use the (often scarce) radio resources and enable smooth inter-working across different accesses and business domains. MRRM mechanisms serve to manage such situations.

One aspect of MRRM is the selection of an access connection from a plurality of available access connections. In other words, when a terminal has the possibility of connecting to a network (e.g. the Internet) via a plurality of access points (e.g. via a GPRS connection, a UMTS connection or a WLAN connection) a decision must be made in the terminal and/or access points and/or network which access connection to select. It is known to evaluate the available access connections in view of one or more access connection properties (such as data rate, delay, reliability, etc.) and to make a decision in accordance with a predetermined selection algorithm that makes a decision based on the access connection information. For example, the selection algorithm can consist in choosing the access connection offering the highest data rate, and accordingly the data rate of the available access connections is measured and compared, and the connection with highest data rate is accordingly chosen. Naturally, the selection decision can be based on more than one parameter and the selection condition can be chosen in any suitable or desirable way.

OBJECT OF THE INVENTION

The object of the invention consists in providing improved methods and devices for performing an access connection selection decision in a multi-access environment.

SUMMARY OF THE INVENTION

This object is achieved by the subject-matter of the independent claims. Advantageous embodiments are described in the dependent claims.

In accordance with the present invention, in a communication system that comprises at least one terminal and at least a first and a second access point as well as a network, and where the first access point offers a first access connection to the terminal, the second access point offers a second access connection to the terminal, a first network connection is provided between the network and the first access point and a second network connection is provided between the network and the second access point, it is proposed to not only make an access connection selection decision based on information related to the access connections, but to also base the access connection selection decision on information related to one or more of the network connections that are provided between the access points and the network.

Based on the present invention, a better access connection selection decision can be made. Namely, by taking into account information related to at least one of the network connections provided between an access point and the network, a more informed selection decision can be made and improved performance can be achieved. For example, if the selection criterion is based upon the available data rate, then it is possible that the first access connection provides a higher data rate than the second access connection. However, if along the connection between the first access point and the network, a network connection is present that has a lower data rate than the second access connection, while the network connection between the second access point and the network has a higher data rate, then the best data rate for connecting the terminal to the network will be achieved by selecting the second access connection. In contrast thereto, the known access selection algorithms would have selected the first access connection.

It can be seen that the concept of the present invention is particularly effective if the bottleneck connection in an overall communication is present between an access point and the network and not at the access connection.

As already mentioned above, the concept of the present invention can be applied in any context in which at least one terminal can access a network via at least two access points. The access technology between the access points can be the same or different for each access point. According to a preferred embodiment, the concept of the invention is applied to wireless access connections, but the invention is by no means restricted thereto, as the problem of proper access connection selection will also appear if a terminal can connect to a network via a plurality of wire-bound access connections, or a mix of wireless and wire-bound access connections.

The term "network connection" within the meaning of the present specification and claims relates to any connection provided between the access point and the network under consideration. As such, the network connection can be wireless or wire-bound. Furthermore, the concept of the present invention also applies if there exists a plurality of network connections between an access point and a network.

It should be noted that the term "connection" refers to any physical or logical communication path, e.g. a physical line or a logical channel on a physical line. The term "connection" especially also relates to the case in which the communication is not connection-oriented, i.e. where the communication is fully packet-oriented.

The access connection information associated with an access connection, or the network connection information associated with a network connection can be chosen in any suitable or desirable way. For example, this information can comprise specific properties or parameters of a connection such as the data rate, the delay, the jitter, the connection capacity, the connection load or any other suitable or desirable measure of the quality of service. The information associated with a connection can also be determined with respect to the environment, e.g. can be the overall load in an area of service associated with the access point, where said overall load provides an indication of the behaviour of the network connection. For example, if the access point is a base station of a cell in a cellular communication system, and the network connection is the connection between said base station and the network that the terminal is attempting to access, then the overall traffic in that cell gives an indication of the behaviour of that network connection, such that this also constitutes network connection information that can be taken into account in the access connection selection decision.

It is also noted that the access connection selection decision can consist in selecting more than one access connection simultaneously. In other words, the access connection selection algorithm can also have outcomes where it is decided to use two or more access connections simultaneously.

BRIEF DESCRIPTION OF FIGURES

Further aspects and advantages of the present invention will become clear from the following description of detailed embodiments, which will be described with reference to the figures, where.

DETAILED DESCRIPTION OF EMBODIMENTS

Figure 1:
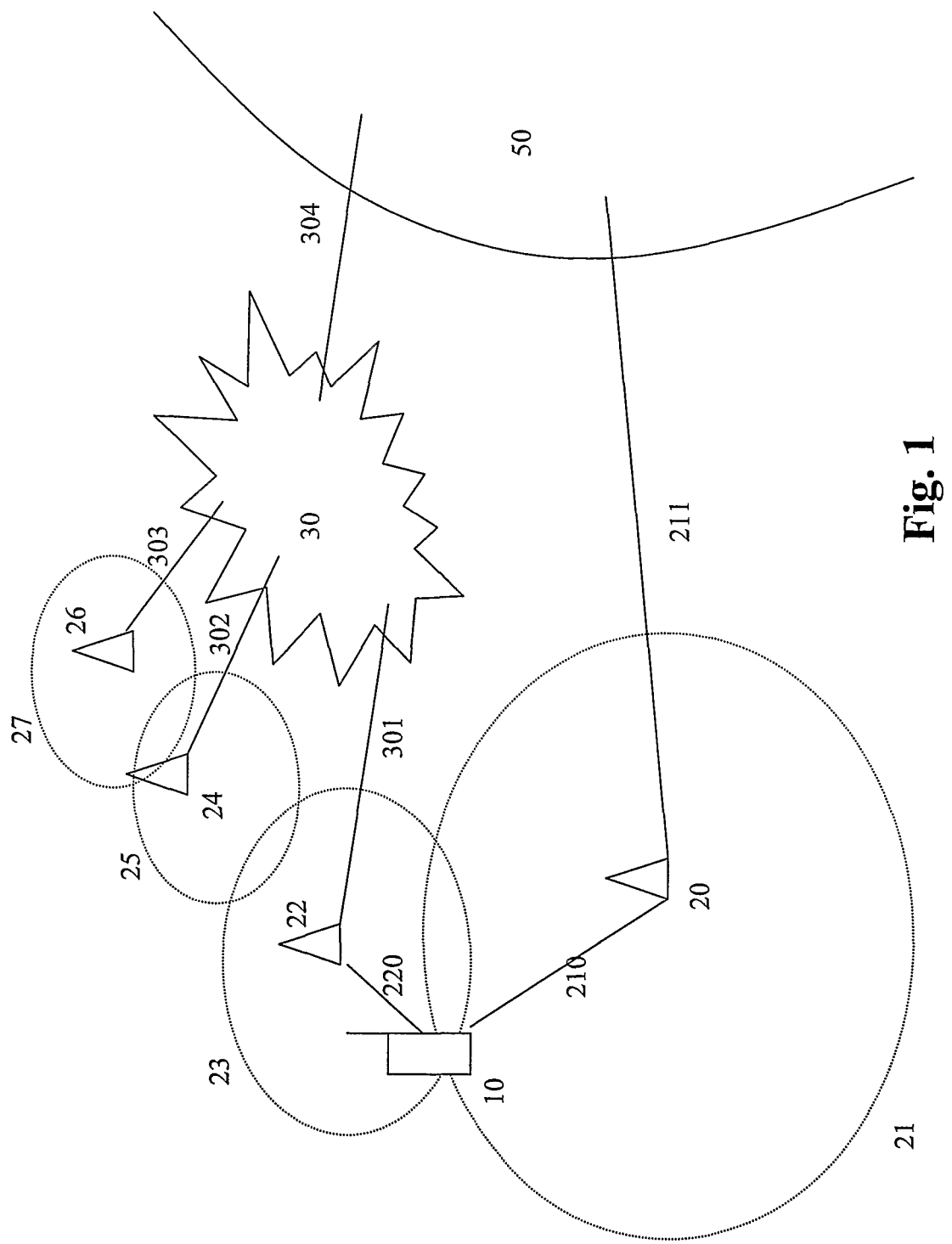
FIG. 1 is a schematic representation of a multi-access communication system.

FIG. 1 shows a schematic overview of a multi-access environment. Access points 20, 22, 24 and 26 are provided, with which terminal 10 can establish an access connection. Each access point 20, 22, 24 and 26 has a respective area of service 21, 23, 25 and 27. If the terminal 10 is within the area of service, then an access connection can be established between the terminal 10 and the respective access point. For example, access point 20 can be the base station of a mobile communication system, such as GSM base station, a GPRS base station, a UMTS base station or the like. Access points 22, 24 and 26 can e.g. be base stations of WLAN hot spots connected to a common local transport network 30. In the example of FIG. 1, the wireless terminal 10 is within the coverage of wireless access points 20 and 22, such that a first access connection 210 is available between terminal 10 and access point 20, and a second access connection 220 is available between terminal 10 and access point 22.

Access point 20 is connected with a network 50 via a network connection 211. It is noted that network connection 211 can consist of a plurality of sub-connections or comprise sub-networks for achieving the connection. The network 50 can be any network to which terminal 10 desires access, e.g. a high capacity transport network towards a further network, or it can e.g. be the Internet.

The access points 22, 24 and 26 are connected with the local transport network 30 (e.g. an Ethernet LAN) via respective connections 301, 302 and 303. The local transport network 30 in turn is connected with the larger network 50 via a network connection 304. The connections 301-304 are again to be understood as any suitable physical or logical communication path and can comprise a number of sub-connections or sub-networks.

FIG. 1 shows a general scenario in which a user terminal 10 is able to connect to different access points, which may be deployed in the same or different network topologies and which may support the same or different radio access technologies (RATs). In the example, access point 20 is connected to the high capacity network 50 via a direct transmission link that may be subject to certain limitations in its capacity and/or quality of service, and the local transport network 30 is connected to the high capacity transport network 50 via a connection 304, which may also have specific limitations in terms of its capacity and/or quality of service.

In the depicted scenario it can happen that one of the connections 301-304 or 211 becomes the connection or link that limits the overall capacity and/or quality of service (i.e. becomes the bottleneck link) between the terminal 10 and the network 50.

To give examples, the network connections 301-304 or 211 can be provided by a fixed link employing e.g. DSL (Digital Subscriber Line) technology, E1/T1/J1s technology (capacity 2/1.5/1.5 Mb/s), or a wireless point-to-point connection using e.g. Minilink or IEEE802.16.

The known multi-radio resource management (MRRM) functions would be able to manage both of the available radio accesses 210 and 220 simultaneously. They could e.g. select which access to use when the user of terminal 10 is within coverage of both access points 20 and 22. This choice could be based on several parameters and/or access characteristics, such as supported rate or transmission delay. The selection algorithm can combine the optimisation of several criteria, e.g. optimising the network performance and the quality of service desired by the user, while also taking into account user preferences, such as access cost. For this purpose, access connection information associated with at least one of the available access connections will be monitored.

It is noted that it is not necessary to monitor information on both access connections 210 and 220 in the example of FIG. 1 as it is e.g. possible that one of the connections is fixed in its behaviour such that it is sufficient to only monitor the information that reflects the varying behaviour of the other access connection (or other access connections in the event of a selection decision is performed with respect to more than two available access connections).

The access connection selection decision in the known MRRM functions will be based on the monitored access connection information. A problem with this scheme is that the network connections that act as transport links between the connection point and the network 50 may constitute hidden bottlenecks that are not reflected by any information or characteristics associated with the access connections.

Figure 6:
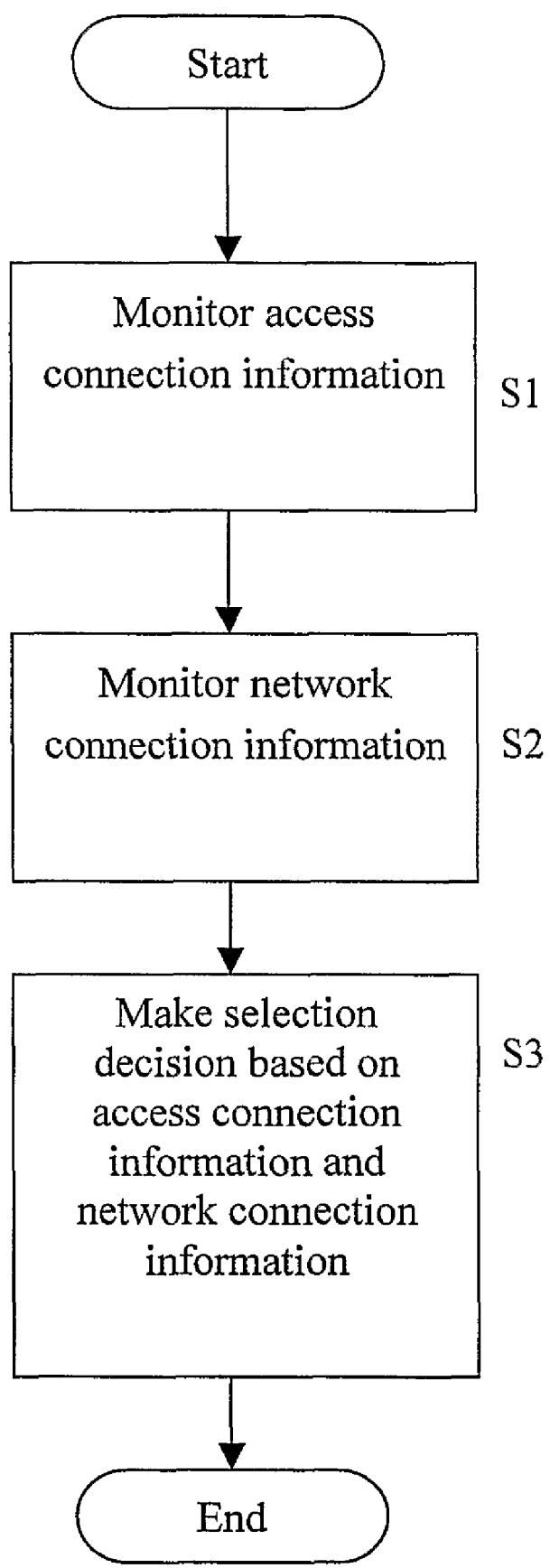
FIG. 6 shows a flowchart of a further embodiment of the present invention.

To overcome this problem the present invention proposes the concept of monitoring network connection information associated with at least one of the network connections 211, 301-304 and also basing the access connection selection decision on the monitored network connection information. This is shown in FIG. 6, which depicts the flowchart of a method embodiment of the present invention. In a first step S1 access connection information, e.g. of access connections 210 and 220, is monitored. In step S2 network connection information is monitored, e.g. of network connection 211. Additionally or alternatively, network connection information related to one or more network connections 301, 302, 303 and 304 could be monitored. Finally, in step S3, the selection decision is based on both the access connection information and the network connection information.

If e.g. access points 22, 24 and 26 are WLAN access points that provide a radio access capacity of 54 Mb/s for a radio access connection, whereas access points 20 is e.g. an UMTS base station offering a radio capacity of 1 Mb/s for a radio access connection, then the conventional access connections/decisions will choose the WLAN connection 220 if the decision criterion is connection capacity. On the other hand, if in applying the concept of the present invention information with respect to the network connection 304 indicates that this network connection provides a lower capacity than 1 Mb/s, then the selection decision of the invention can choose access connection 210 despite the high capacity of access connection 220. The result is improved performance.

It is noted that the method of access management or access selection can be performed in any suitable or desirable way. According to a preferred embodiment, a multi-access decision entity and a network connection monitoring entity are provided. An entity within the meaning of the present specification and claims is any hardware, software or combination of hardware and software that can provide a desired functionality. As such, an entity can be provided in one physical location, such as the terminal or a network node, or can be spread out over several physical locations.

In accordance with the present embodiment, the network connection monitoring entity obtains the network connection information, e.g. by conducting measurements at the network connection being monitored, and sends this monitored network connection information to the multi-access decision entity. The multi-access decision entity then makes the access connection selection decision. The multi-access decision entity can be a part of a larger entity such as a multi-access management entity, e.g. a MRRM entity or function. The multi-access decision entity or only a part thereof can e.g. be provided in the terminal 10. However, it is noted that the access connection selection decision can also be made elsewhere e.g. in one of the access points, or by different entity parts provided in different access points or in the local transport network 30.

Figure 2:
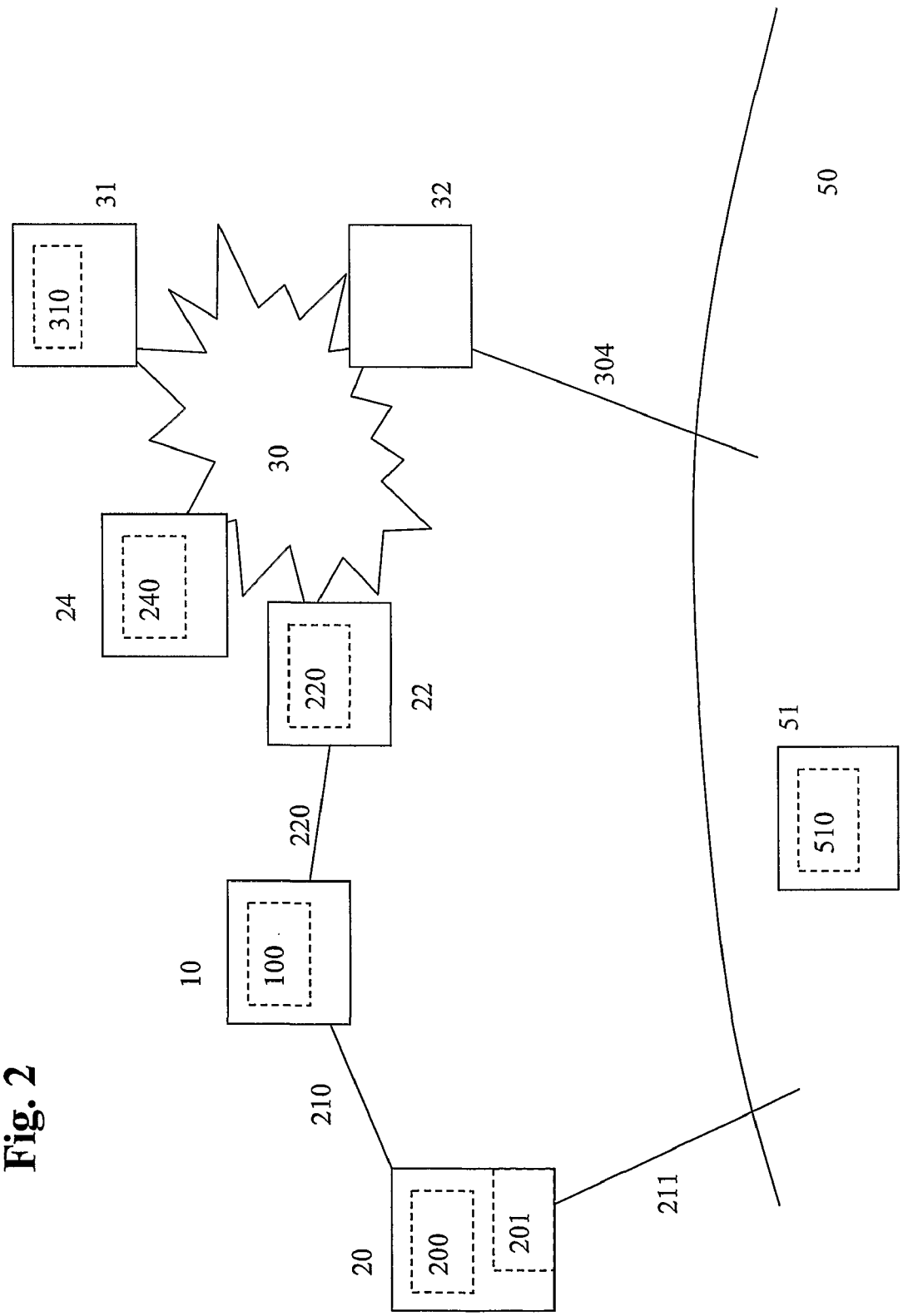
FIG. 2 shows an embodiment of the present invention.

FIG. 2 shows an example that depicts the same situation as in FIG. 1, where like parts are described by like reference numerals, such that a repeated description is not necessary. In addition to the elements already described with reference to FIG. 1, FIG. 2 also shows a router or switch 32 in the local transport network 30, for providing the network connection 304 to network 50. Furthermore, a MRRM server 51 comprising an MRRM entity part 510 is shown in network 50. Also, an MRRM server 31 comprising an MRRM entity part 310 is shown as a part of local transport network 30. Access point 22 is shown as comprising an MRRM entity part 220, an access point 24 is shown as comprising ah MRRM entity part 240. Terminal 10 is shown as comprising an MRRM entity part 100 and access point 20 is shown as comprising an MRRM part 200.

The access point 20 furthermore comprises a network connection monitoring entity 201, which in the shown example is arranged for monitoring a characteristic or property of network connection 211.

Figure 3:
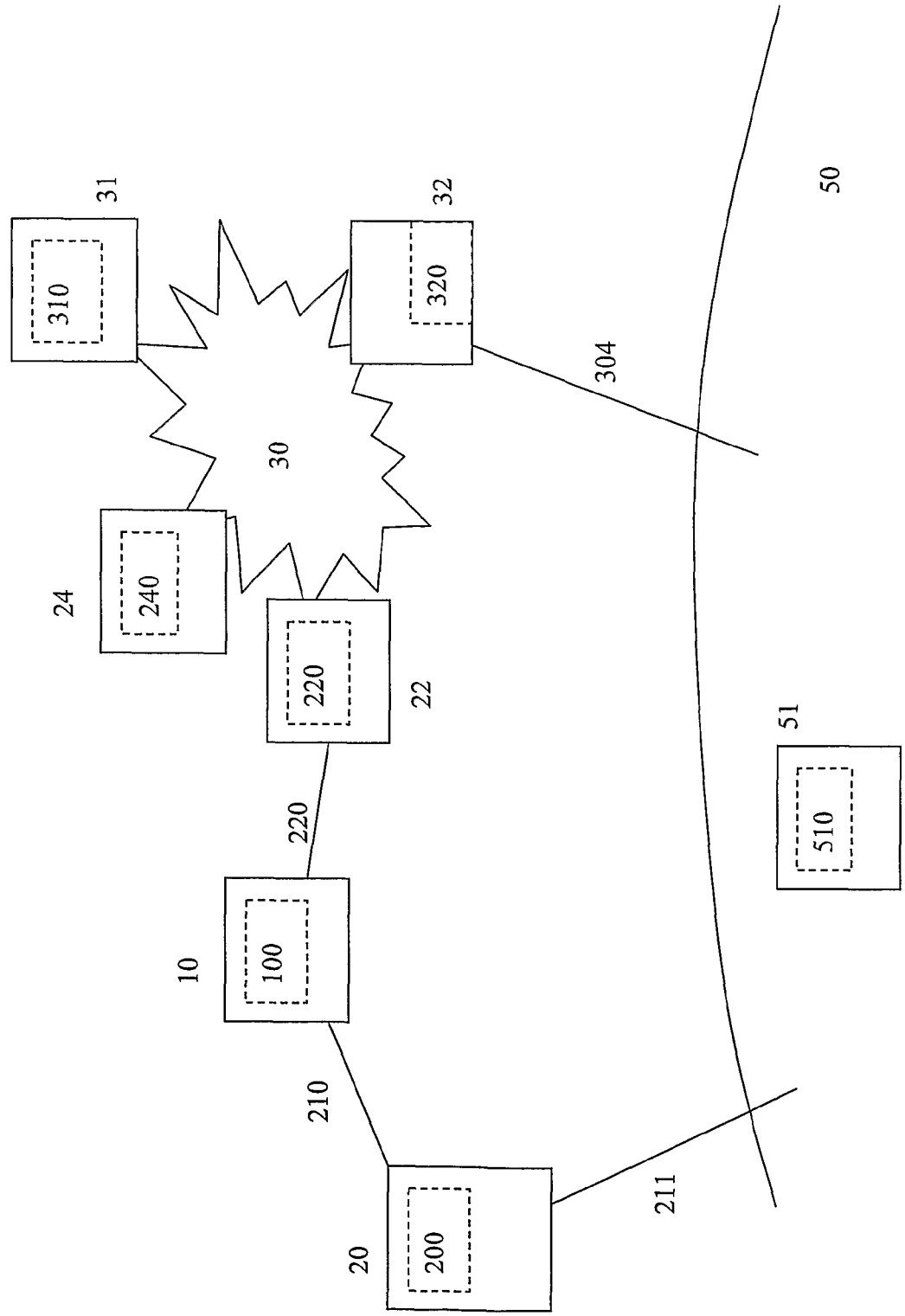
FIG. 3 shows a further embodiment of the present invention.

FIG. 3 shows the same situation as FIG. 2, where the same reference numerals are used, such that a repeated description of the elements is not necessary. However, in FIG. 3 the router or switch 32 comprises a network connection monitoring entity 320 for monitoring one or more characteristics or properties of the network connection 304.

Naturally, the systems and elements shown in FIG. 2 and FIG. 3 are only examples, and it is e.g. possible to also combine the embodiments, i.e. to have a network connection monitoring entity both in the access point 20 and in the router/switch 32, and/or to have further network connection monitoring entities in one or more of the access points 22 and 24. In any case, the one or more network connection monitoring entities, which can also be referred to as a transport network resource monitor (TRM) function, are arranged to signal the monitored network connection information to the multi-access decision entity, which e.g. can be provided as a part of the MRRM entity part 100 of terminal 10. Naturally, the multi-access decision entity could be spread out over further elements and could be a part of each of the shown MRRM entity parts 100, 200, 220, 240, 310 and 510, in which case the respective network connection monitoring entity or entities will be arranged to provide the network connection information to all of the respective MRRM entity parts, which together form an MRRM entity. Naturally, the described distribution of MRRM entity parts is only an example, and the MRRM function could also be provided in a single place, e.g. in terminal 10. However, it is preferably that the MRRM function be spread out over many communication elements, such that a large amount of cooperation can be obtained in order to provide a better resource management decision.

Expressed differently, the network connection monitoring entity or monitoring function is able to support different MRRM distributions and MRRM decision points. If the end user performs access selection, the network connection monitoring entity can signal the appropriate information directly to the user terminal 10 via e.g. a control channel on the radio access. If the decision point is within a network, e.g. in server 31 or server 51, then the monitored network connection information can be signalled via an appropriate path, e.g. from monitoring entity 201 to server 51 via network connection 211 or from monitoring entity 220 to server 51 via network connection 304. Naturally, monitoring entity 320 could also relay the information via terminal 10 and access point 20 and network connection 211 to server 51.

The monitored network connection information received by the multi-access decision entity from the monitoring entity can e.g. be used to calculate a compounded utility of the considered radio access and its associated network connection. For example, if a supported rate or available capacity is used as a criterion, then the minimum of the rate/capacity on the radio access connection and the associated network connection could be used. If delay or delay jitter is used as a criterion, then the sum of the delay/jitter of the radio access connection and the associated network connection could be used. If load is used as a criterion, then the maximum or minimum of the normalized load of the radio access connection and the network connection could be used.

Figure 4:
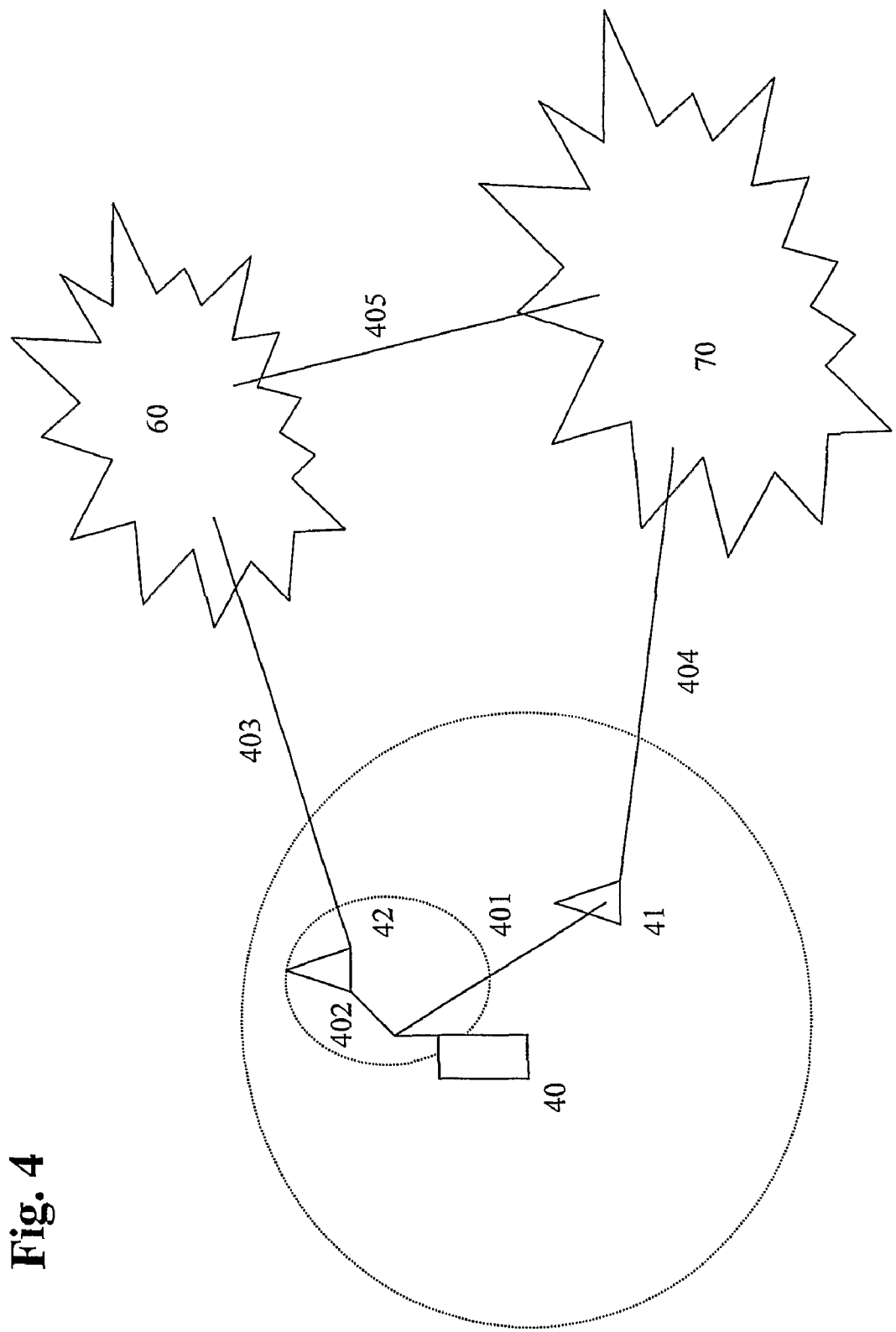
FIG. 4 shows another multi-access environment.

FIG. 4 shows another example scenario in which the concept of the present invention can be applied. Reference numeral 40 describes a terminal device that can establish an access connection 401 with a first access point 41 and a second access connection 402 with a second access point 42. For example, the two access points can be associated with different radio access technologies. Furthermore, access point 41 is connected with an operator network (e.g. a telephone network) via a network connection 404, while access point 42 is connected with an ISP (Internet Service Provider) network 60 via a network connection 403, which could e.g. be a fixed broadband connection such as a DSL connection. The network 60 could also e.g. be a corporate network.

Figure 5:
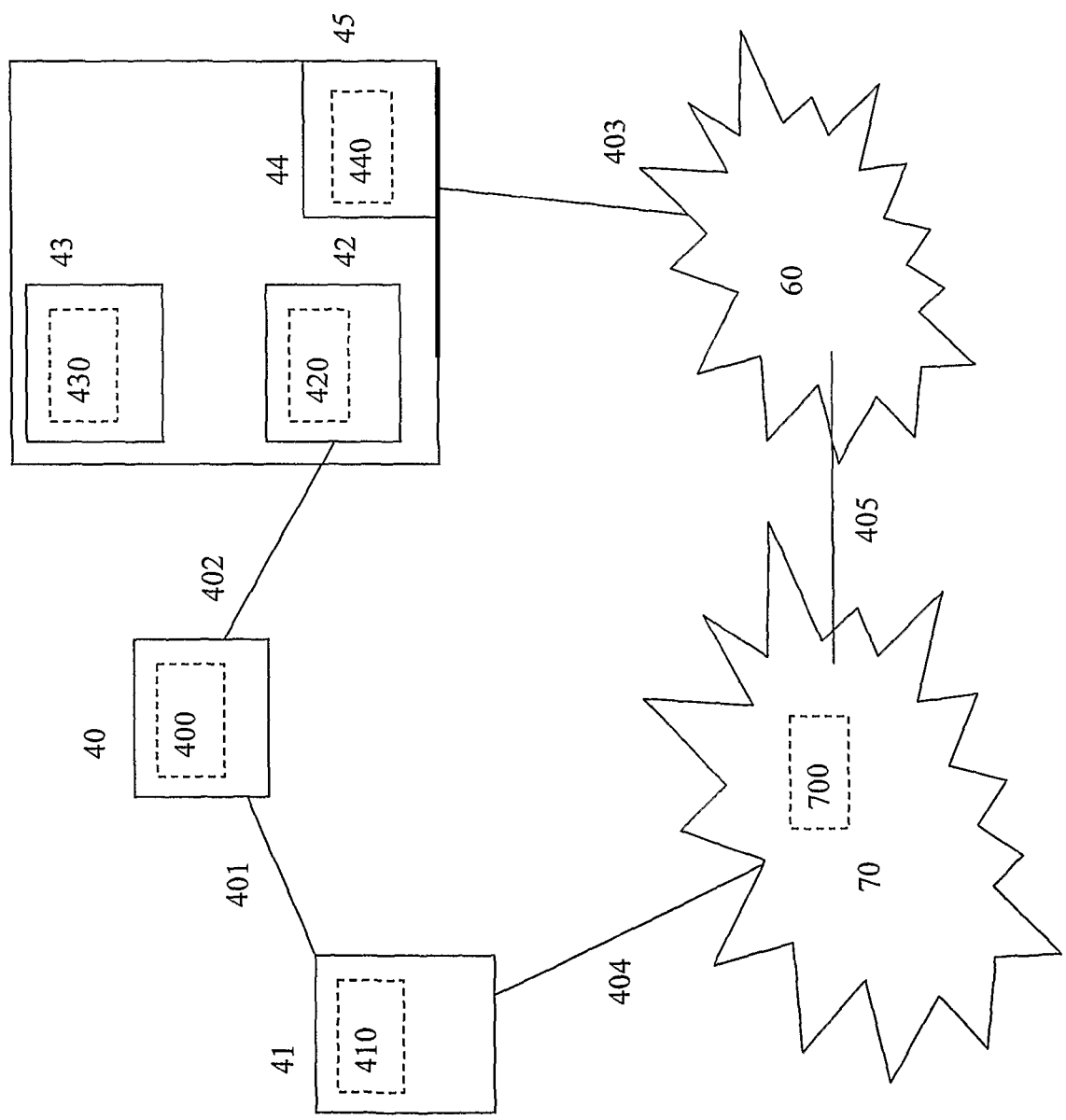
FIG. 5 shows a further embodiment of the present invention.

FIG. 5 shows the same elements as FIG. 4, where the same reference numerals are used to describe the same elements, such that a repeated description is not necessary. In addition to FIG. 4, FIG. 5 however also shows MRRM entity parts 400, 410, 420, 430 and 700 provided respectively in terminal 40, access point 41, access point 42, a further access point 43 and operator network 70. Furthermore, FIG. 5 shows a router or switch 44 comprising a connection monitoring entity 440 for monitoring the network connection 403.

FIG. 4 shows the scenario with cooperation between a mobile network operator and a local access network. A small business or a private person operates the local access network that comprises one or more wireless access points 42, each connected to the ISP or corporate network 60 via e.g. a fixed broadband connection. The local access network is used for the small business's or private person's own traffic, but at the same time allows anyone within coverage to use the local access or accesses publicly, through cooperation with a mobile network operator. This cooperation can be established e.g. through franchising agreements between the mobile network operator and the operator of the local access network, where the mobile network operator can e.g. give kickback incentives for the public use. As an example, the incentive can consist in having a flat rate broadband connection, where the operator of the local access network does not have any additional costs for using available bandwidth that he does not require for his own traffic. This available or spare bandwidth can then be offered to the public as a marketing measure, e.g. in order to attract more customers into his business location, such as a store or restaurant.

The cooperation can be negotiated on a long term basis or on an ad hoc basis. Since the fixed broadband connection is used both for the local access network's own traffic as well as for the public wireless access traffic, it may be a bottleneck at least for the public access use, because in general only the spare bandwidth will be available for public use. In this scenario, the concept of the present invention can again be advantageously applied, in order to make a better access selection connection decision. Namely, the network connection monitoring entity 440 in the router 44, which monitors the fixed broadband network connection 403 provided by router 44, is able to send the network connection information (e.g. a value of the spare bandwidth available for public traffic) to the one or more multi-access decision entities provided in the one or more MRRM entity parts.

The MRRM entity parts, which can also be referred to as MRRM functions are preferably able to manage both the access to the operator network 70 and the local access in access point 402 simultaneously. The network connection monitoring entity is responsible for continuous monitoring of the fixed broadband connection characteristics. As shown in the figures, the monitoring entity is preferably located in the router (e.g. a DSL router or cable modem router) connecting the local access network to the fixed broadband connection. The local access network itself may consist of a single combined access point and router.

The network connection monitoring entity or TRM can e.g. monitor the current load or delay of the broadband connection. An estimate of the delay can be obtained, e.g. by sending a ping to operator servers. For load estimates it can occur that the fixed broadband connection is the limiting link. This could e.g. also be part of an arrangement between the mobile network operator of network 700 and the operator of corporate network or ISP 60 regarding the capacity. In addition, the fixed broadband connection itself will usually have a well-defined capacity, e.g. 768 kb/s or 1.5 Mb/s DSL. If the traffic of the operator of the local access point 42 is given highest priority via an appropriate policing function, then the available capacity for public wireless access will be what remains of the fixed capacity. In other words, an estimate of the available capacity can be obtained by monitoring the volume of prioritised home network traffic going through the broadband connection, and subtracting this value from the fixed broadband connection capacity.

The network connection monitoring function can signal the broadband connection characteristics or properties to the MRRM function, which may be distributed over several elements including the local access network 42, the user terminal 40, the base station 41 and different nodes within the operator network 70. The network connection monitoring function can support different MRRM distributions and MRRM decision points. If the end user performs access selection, i.e. the selection entity is in the terminal, then the network connection monitoring entity can signal the information directly to the user terminal via e.g. a control channel on the local access. If the decision point is within the operator network 70, then the monitored network connection information can be signalled via the ISP/corporate network 60, or relayed via the user terminal 40 and the base station 41.

It is noted that the concept of the invention can naturally also be applied in a single-operator case, in which there can also be limiting network connection characteristics that vary over time and that can be taken into account in a multi-access selection decision with the help of a network connection monitoring function or entity. Examples are transport network connections provided by microwave point-to-point links, whose characteristics can change with weather conditions. Another example are access points that are connected with public network connections on an arbitrary basis depending on whatever public network connection is available. In this case, a network connection monitoring function could provide a kind of simple O&M (operation and maintenance) support, which can be combined with the MRRM function to support access selection decisions. Another example is a wireless network extended with a relay node. In this example a user terminal can either directly connect to the access point or alternatively connect to the access point via a relay node. The utility for connection to a relay node is typically defined by the load of the area of service (e.g. cell) served by the relay node and/or the link quality performance of the radio link between the user terminal and the relay node. The link between the relay node and access point in this case corresponds to a network connection that can be monitored by a network connection monitoring entity in either the access point or the relay node. The behaviour of the network connection can vary depending on link quality or load of the link connecting the relay node to the access point.

As becomes clear from the above description, the present invention can be embodied by a method of access selection in a communication system or by a corresponding communication system. It can furthermore be embodied by a multi-access decision entity for such a communication system, where the multi-access decision entity is arranged for obtaining access connection information associated with at least a first and second access connection, for making an access connection selection decision based on the obtained access connection information, for receiving network connection information associated with at least one of two network connections, and for also basing the access connection selection decision on the received connection information. It is noted that the obtaining of the access connection information can be done in any suitable or desirable way, e.g. by monitoring such information in the multi-access decision entity or by receiving it from some other entity in the system.

The invention can also be embodied by a method of controlling the just described multi-access decision entity to appropriately obtain access connection information and to receive network connection information, and to make an access connection selection decision based on the obtained access connection information and the received network connection information. The invention can furthermore be embodied by a computer program product, such as computer storage device, a computer program or computer program code parts that when loaded into the memory of a programmable communication device execute the method of controlling the multi-access decision entity.

The present invention can furthermore be embodied by a network connection monitoring entity for the above described communication system, which is arranged for monitoring network connection information associated with at least one network connection, and for sending the monitored network connection information to a multi-access decision entity. The invention can furthermore be embodied by a method of appropriately controlling a network connection monitoring entity to monitor network connection information associated with a network connection and to send the resulting information to a multi-access decision entity. Furthermore, the invention can be embodied by a computer program product, such as computer storage device comprising a computer program or computer program code parts that when executed on a programmable communication device can control the device in accordance with the method of controlling a network connection monitoring entity.

Although the present invention has been described with reference to a number of detailed embodiments, the description of detailed embodiments only serves to provide a better understanding of the invention, and is not intended to be in any way limiting. The scope of protection is defined by the appended claims. Reference signs in the claims serve to make the claims easier to read but have no limiting effect.

The invention claimed is:

1. A method of access selection in a communication system comprising a terminal, first and second access points, and a network, and wherein said first and second access points provide respective first and second access connections to said terminal, and first and second network connections are provided between said network and said first and second access points, respectively, and transport data between said terminal and said network via one or both of said first and second access points, said method comprising:
   monitoring access connection information associated with at least one of said first and second access connections at a network connection monitoring device in the communication system;
   monitoring network connection information associated with at least one of said first and second network connections at the network connection monitoring device; and
   selecting an access connection at a multi-access decision device in the communication system based on said monitored access connection information and on said monitored network connection information.

2. The method of claim 1 wherein at least one of said first and second access connections comprises a wireless connection.

3. The method of claim 1 wherein said method further comprises:
   sending said monitored network connection information from said network connection monitoring device to said multi-access decision device; and
   selecting an access connection at said multi-access decision device.

4. A communication system, comprising:
   a terminal;
   a first access point;
   a second access point;
   a network;
   a first access connection between said first access point and said terminal;
   a second access connection between said second access point and said terminal;
   a first network connection between said network and said first access point;
   a second network connection between said network and said second access point;
   a multi-access decision entity configured to receive access connection information associated with at least one of said first and second access connections; and
   a network connection monitoring entity configured to monitor network connection information associated with at least one of said first and second network connections, and to send said monitored network connection information to said multi-access decision entity; wherein
   said multi-access decision entity is further configured to select an access connection based on said received access connection information and on said monitored network connection information.

5. The communication system of claim 4 wherein the terminal comprises at least part of said multi-access decision entity.

6. The communication system of claim 4 further comprising a multi-access management entity, and wherein said multi-access decision entity is part of the multi-access management entity.

7. A multi-access decision device for a communication system having a terminal, first and second access points, and a network, and wherein said first and second access points provide respective first and second access connections to said terminal, and wherein first and second network connections are provided between said network and said first and second access points, respectively, said multi-access decision device comprising:
   a memory to store program instructions at said multi-access decision device; and
   a controller at said multi-access decision device configured to execute the program instructions to:
      receive, at said multi-access decision device, access connection information associated with at least one of said first and second access connections;
      receive, at said multi-access decision device, network connection information associated with at least one of said first and second network connections; and
      select, at said multi-access decision device, an access connection based on said obtained access connection information and on said received network connection information.

8. A method of controlling a multi-access decision device in a communication system having a terminal, first and second access points, and a network, wherein said first and second access points provide respective first and second access connections to said terminal, and wherein first and second network connections are provided between said network and said first and second access points, respectively, said method comprising:
   receiving access connection information associated with at least one of said first and second access connections at the multi-access decision device;
   receiving network connection information associated with at least one of said first and second network connections at the multi-access decision device; and selecting an access connection at the multi-access decision device based on said obtained access connection information and on said received network connection information.

9. A programmable communication device for a communication system having a terminal, first and second access points, and a network, wherein said first and second access points provide respective first and second access connections to said terminal, and wherein first and second network connections are provided between said network and said first and second access points, respectively, said programmable communication device comprising:
memory to store computer logic, the logic configured to:
receive access connection information associated with at least one of said first and second access connections;
receive network connection information associated with at least one of said first and second network connections; and
select an access connection based on said obtained access connection information and on said received network connection information.

* * * * *

UNITED STATES PATENT AND TRADEMARK OFFICE
CERTIFICATE OF CORRECTION

PATENT NO. : 8,200,820 B2
APPLICATION NO. : 12/063597
DATED : June 12, 2012
INVENTOR(S) : Prytz et al.

Page 1 of 1

It is certified that error appears in the above-identified patent and that said Letters Patent is hereby corrected as shown below:

In Column 4, Line 23, delete "2/1.5/1.5" and insert -- 2/1, 5/1.5 --, therefor.

In Column 7, Line 59, delete "700" and insert -- 70 --, therefor.

Signed and Sealed this
Thirteenth Day of November, 2012

David J. Kappos
*Director of the United States Patent and Trademark Office*